United States Patent [19]

Ware

[11] Patent Number: 4,945,818
[45] Date of Patent: Aug. 7, 1990

[54] STROKE INDICATOR FOR AIR OPERATED DIAPHRAGM SPRING BRAKES

[75] Inventor: Nathan C. Ware, North Muskegon, Mich.

[73] Assignee: Lear Siegler Truck Products Corporation, Muskegon, Mich.

[21] Appl. No.: 296,517

[22] Filed: Jan. 12, 1989

[51] Int. Cl.⁵ .................... F01B 25/26; F01B 31/12
[52] U.S. Cl. ........................ 92/5 R; 92/63; 188/170; 188/1.11
[58] Field of Search ............ 92/5 R, 48, 62, 63, 92/64, 130 R, 130 A, 132; 303/71; 188/170, 1.11

[56] References Cited

U.S. PATENT DOCUMENTS

| | | |
|---|---|---|
| 3,298,466 | 1/1967 | Ayers, Jr. et al. |
| 3,359,869 | 12/1967 | Avrea |
| 3,388,682 | 6/1968 | Whiting ................................ 92/5 R |
| 3,431,031 | 3/1969 | Ike |
| 4,207,565 | 6/1980 | Isakson et al. ........................ 92/5 R |
| 4,279,214 | 7/1981 | Thorn ................................. 188/1.11 |
| 4,583,071 | 4/1986 | Sebalos et al. ...................... 188/1.11 |
| 4,757,300 | 7/1988 | Sebalos .............................. 188/1.11 |
| 4,776,438 | 10/1988 | Schandelmeier .................... 188/1.11 |
| 4,800,991 | 1/1989 | Miller ................................ 188/1.11 |

FOREIGN PATENT DOCUMENTS

| | | | |
|---|---|---|---|
| 0889959 | 12/1981 | U.S.S.R. ............................. | 188/1.11 |
| 1302928 | 1/1973 | United Kingdom ............... | 188/1.11 |
| 2021695 | 12/1979 | United Kingdom ............... | 92/5 R |

Primary Examiner—Edward K. Look
Assistant Examiner—Thomas Denion
Attorney, Agent, or Firm—Varnum, Riddering, Schmidt & Howlett

[57] ABSTRACT

A first visual indicium (44) and a second visual indicium (50) are provided on a push rod (10) in an air operated diaphragm spring brake. The push rod (10) is mounted for reciprocal movement between an operative position and an inoperative position through an opening (26) in a service brake housing (16). The first indicium (44) comprises a discontinuity (45) in the surface of the push rod (10) having a leading edge (46) and grooves (48). The first indicium is positioned on the push rod such that the leading edge (46) will be exterior to the service chamber (12) only when the push rod is in the operative position and the brakes are substantially out of adjustment. The second visual indicium (50) comprises a second discontinuity formed of at least a leading edge (52) and a trailing edge (54). The second visual indicium (50) is positioned on the push rod whereby the trailing edge (54) will normally be exterior of the service chamber 12 adjacent the opening (26) when the push rod is in the inoperative position.

14 Claims, 2 Drawing Sheets

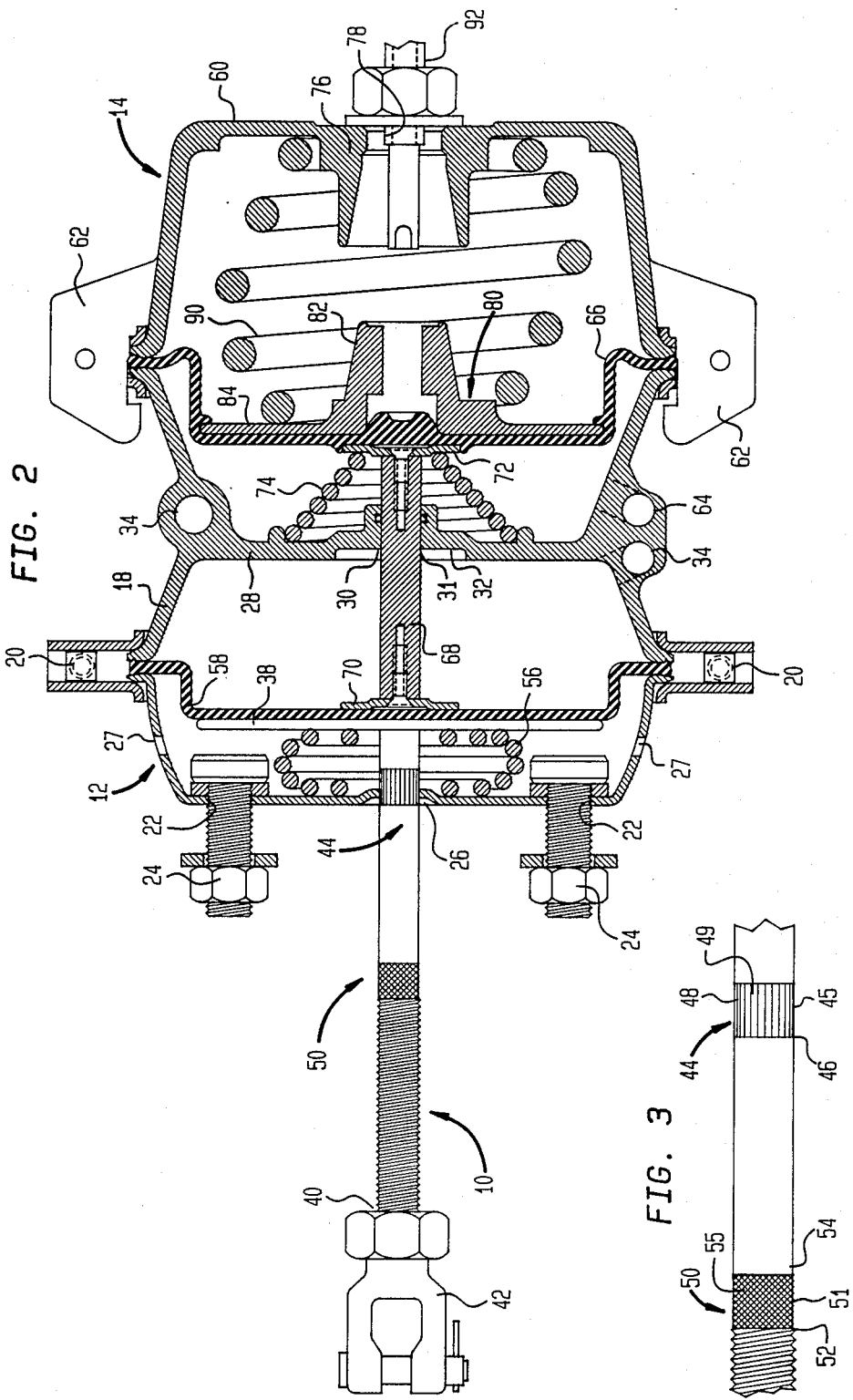

STROKE INDICATOR FOR AIR OPERATED DIAPHRAGM SPRING BRAKES

BACKGROUND OF THE INVENTION

1. Field of the Invention

This invention relates to air-operated diaphram spring brakes of the type employing a push rod actuator and used with air brake systems on vehicles such as trucks. More particularly, the invention relates to a stroke indicator which is integrally marked on the push-rod actuator to visually show when the brake is out of adjustment or when brake system components are not functioning properly.

2. State of the Prior Art

A typical air brake system for a vehicle such as a bus, truck or the like includes separate brake means such as a brake shoe and drum at the vehicle wheels. The brake shoes are actuated in one direction to apply the brakes and in the other direction to release the brakes. The brake means may serve as both service and emergency brakes, and individual brake actuators are located adjacent the wheels for actuation of the brake means.

A typical brake actuator includes a service brake actuator for applying and releasing the brakes in response to delivery and exhaust of compressed air. Often a spring brake actuator is disposed in tandem with the service brake actuator. The spring brake actuator uses the force of a strong compression spring to operate the service brake actuator and apply the brakes when air in a spring chamber is reduced below some predetermined level. Air may be reduced in the spring brake actuator under the control of the operator in the manner of a parking brake, or automatically in emergencies such as a failure of portions of the service brake air system.

The brake actuators typically employ diaphragms that move in response to air pressure and springs. The diaphragms in turn actuate push rods which move the brake means between operative and inoperative positions.

With structures of this general type, it is frequently difficult to determine when the brake linings or pads have become worn to the extent that the brakes need adjustment or replacement. Frequently, the operator or mechanic either had to visually estimate the position of the brake mechanism with brakes applied versus the unapplied position or had to physically measure the stroke of the push rod. Prior solutions for determining such wear have included complex and expensive mechanical and electrical components to measure the amount of stroke through which the push rod moves. Other devices require the addition of discs or pointer brackets to the service brake housing and to the push rod to measure the stroke. Visual indicators include the use of adhesive stickers applied to the push rod. All such devices are subject to wear and can easily be jolted out of adjustment or separated from the brake actuator as a result of excessive vibration, heat, dust, weather and wearing of components during normal use.

SUMMARY OF THE INVENTION

According to the invention, a visual indicium is provided by a discontinuity formed in the surface of a push rod in an air-operated diaphragm spring brake. The discontinuity is positioned on the push rod so that a portion of the indicium will be exterior relative to the housing only when the push rod is in an operative position and the braking mechanism is substantially out of adjustment. The discontinuity comprises at least one indentation on the push rod, which may be a groove. A coating is applied at the discontinuity to fill the indentation.

A second visual indicium may be provided by a second discontinuity formed in the surface of the push rod intermediate the first discontinuity and an outer end of the push rod. The second discontinuity is so positioned that it will be adjacent an opening in a service brake housing when the push rod is in an inoperative position. The second discontinuity also comprises at least one indentation on the push rod which may be a groove. The second indicium, like the first, may comprise a coating.

BRIEF DESCRIPTION OF THE DRAWINGS

FIG. 2 is a cross-sectional view of an air operated diaphragm spring brake of FIG. 1 in an operative position, with a minimal amount of stroke remaining in the push rod; and FIG. 3 is an enlarged fragmentary elevational view of the push rod according to the invention.

DETAILED DESCRIPTION OF THE DRAWINGS

Figure 1:
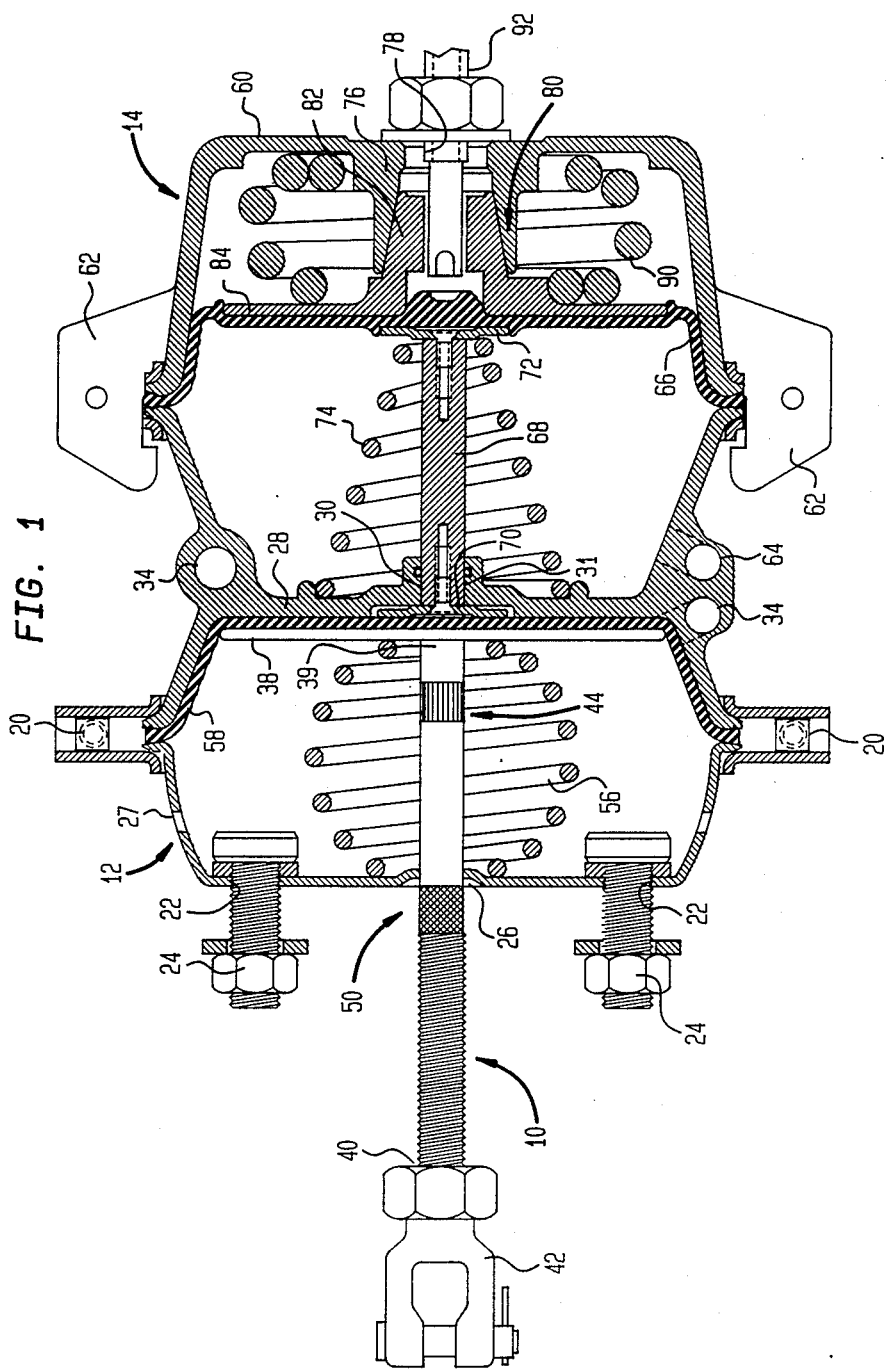
FIG. 1 is a cross-sectional view of an air-operated diaphragm spring brake showing a push rod according to the invention in a fully retracted position.

Referring now to the drawings, there is shown an air-operated diaphragm spring brake of a type well known in the art. The brake is adapted to be mounted to an axle (not shown) of a vehicle and is further adapted to operate a braking system (not shown) through a push rod 10 which extends to and connects with the braking system of the vehicle.

The air operated diaphragm spring brake comprises a service brake chamber 12 and a spring brake chamber 14 joined in tandem. The service brake chamber 12 comprises a cup-shaped service housing 16 and a double-cup shaped service/spring adaptor housing 18 joined by a clamp 20 and forming a hollow interior chamber. A rolled lip or similar integral forming means may be substituted for the clamp 20. Openings 22 are provided in the service housing 16 for bolts 24 which fasten the housing 16 to a bracket (not shown) on the axle. A central opening 26 and side openings 27 are also provided in the service housing 16.

The service/spring adaptor housing 18 forms a divider wall 28 and has a central opening 30 with one or more O-rings 31 positioned therein. An indentation or angular depression 32 is formed around the opening 30. An aperture 34 is provided in the adaptor housing 18 for providing communication between a source of pressure (not shown) and the interior of the service brake chamber 12.

The service brake push rod 10 is mounted in the service brake chamber 12 for reciprocation within the opening 26 and carries a pressure plate 38 at an inner end 39 thereof. An outer end 40 of the push rod 10 is journalled into a bracket means 42 for connection to the braking system. A first indicium 44 is integral with the push rod 10 near the pressure plate 38. As shown in FIG. 3, the indicium comprises a discontinuity 45 in the surface of the push rod 10. The discontinuity 45 of the first indicium 44 may be one or more circumferential grooves or a series of parallel longitudinal grooves 48 as shown near the inner end 39 of the push rod 10. Such a configuration is sometimes called a straight knurl. The discontinuity 45 may be cross hatched grooves in the manner of a diamond knurl, or any other pattern that would serve the function of indicia on the surface of the push rod 10. The indicium 44 preferably also comprises a coating 49 of a bright color such as orange. The grooves 48 will thus be filled with the coating 49 so that even if the coating were to wear off the continuous surface of the push rod 10, the coating remaining in the grooves will maintain the visibility of the indicium 44. Preferably, the indicium 44 also comprises a leading edge 46. The leading edge 46 is so positioned on the push rod that it will begin to emerge from the opening 26 when the push rod 10 has approximately one-half inch of stroke remaining as it moves to an operative position in a manner described hereinafter.

A second indicium 50 may likewise be integral with the push rod 10 and located intermediate the first indicium 44 and the outer end 40. Preferably, the second indicium 50 will comprise a discontinuity 51 having a form slightly different from the first indicium 44. For example, the second indicium 44 may comprise a diamond knurl if the first indicium 44 is a straight knurl. The discontinuity 51 also includes a leading edge 52 and a trailing edge 54. The second indicium 50 is located on the push rod 10 so that the trailing edge 54 thereof will be coplanar with the opening 26 when the push rod is moved to an inoperative, fully retracted position as shown in FIG. 1. The second indicium 50 may also comprise a coating 55.

Referring again to FIGS. 1 and 2, a compression spring 56 extends between a central portion of the service housing 16 and the pressure plate 38 to bias the pressure plate 38 and thus the service brake push rod 10 to the fully retracted position as viewed in FIG. 1. The fully retracted position may be defined as the inoperative position in which the brakes are released. A first elastomeric diaphragm 58 (also known as the service brake diaphragm) is mounted within the service brake chamber 12 and is clamped between the service housing 16 and the service/spring adaptor housing 18. The spring-biased pressure plate 38 forces the diaphragm 58 against the divider wall 28 of the service/spring adaptor housing 18 to the inoperative position as shown in FIG. 1.

When air is supplied through the aperture 34 as, for example, when the brakes are applied by a vehicle operator, air pressure is introduced between the diaphragm 58 and the divider wall 28, thereby forcing the diaphragm 58 toward the central portion of the service housing 16. In this manner, the push rod 10 is extended to an operative position as illustrated in FIG. 2 to apply braking pressure to the vehicle brakes in a conventional fashion. Thus, the operative position is the maximum adjusted extension of the push rod exterior to the service brake housing.

The brakes are adjusted to a degree of movement whereby the first indicium 44 will not normally be visible as the push rod 10 reciprocates between operative and inoperative positions. As the brakes wear, however, or as they become out of adjustment, the push rod 10 requires a longer stroke to reach an operative position from the inoperative position. Brakes go out of adjustment for many reasons, but primarily because of worn brake linings. Thus, the push rod must move through a longer stroke to cause the brake pads to engage the brake drums or rotors. As the leading edge 46 of the first indicium 44 begins to be visible from the exterior of the opening 26, it serves to visually indicate that the brakes are substantially out of adjustment.

The second indicium 50 serves to alert the operator or mechanic that there is a first indicium 44 on the pushrod 10 within the housing 12 when the brakes are normally adjusted. Further, the second indicium 50 may alert the operator or mechanic to the fact that the push rod 10 may be unable to return to a normal position when the brakes are released. Thus, if the second indicium 50 is not adjacent the opening 26 when the push rod is in the inoperative position, an otherwise undetected problem may have occurred. For example, a malfunctioning slack adjustor, insufficient air pressure, a broken spring or binding foundation brake components may prevent the normal positioning of the push rod 10 and cause premature wear, excessive heat and other complications which reduce breaking efficiency.

Because the indicia 44, 50 are integral with the push rod 10, they cannot become dislodged, and do not require periodic calibration. Furthermore, even if the indicia wear, they do not wear circumferentially and the brightly colored paint embedded in the grooves or knurls will still be visible.

The spring brake chamber 14 comprises a side of the service/spring adatpor housing 18 and a spring housing 60 which is secured to the service/spring adaptor housing 18 through a clamp 62, or sealed thereto by swaging. An aperture 64 is provided within the service/spring adaptor housing 18 to connect the interior of the spring brake chamber 14 with a source of pressure (not shown). A second elastomeric diaphragm 66 (known as the spring diaphragm) is suspended within the spring brake chamber between the service/spring adaptor housing 18 and the spring housing 60. An adaptor push rod 68 is mounted within the spring brake chamber 14 and has a reaction plate 70 attached to one end, and a pressure plate 72 attached to the other end thereof. The adaptor push rod 68 extends through the opening 30 in sealing engagement with the O-ring 31. The pressure plate 72 seats within the angular depression 32 of the divider wall 28. A compression spring 74 is mounted within the spring chamber 14 between the divider wall 28 and the reaction plate 70 to bias the adaptor push rod 68 into an inoperative position as illustrated in FIG. 1.

The spring housing 60 has formed in a central portion thereof a cone receptacle 76 which forms a central opening 78. This opening expands in a conical fashion from the exterior and into the interior of the spring chamber 14.

A receptacle plate 80 may have a conical portion 82 within an outer surface which complements the central opening 78 of the cone receptacle 76 and further has a pressure plate 84 at an inner portion thereof which bears against the diaphragm 66. A central opening 86 with lands 88 is provided in the center of the receptacle plate 80. A strong force compression spring 90 is positioned between the pressure plate 84 and the spring housing 16 to bias the former to the position illustrated in FIG. 2.

A release tool 92 may be provided within the central opening 78 of the cone receptacle 76 by mechanically drawing the receptacle plate 80 back into the fully retracted position illustrated in FIG. 1 in the event of an air pressure failure within the spring chamber 14, or if there is a need to cage the compression spring 90 in order to dismantle the spring brake for service.

In operation of the spring brake, air pressure is continually supplied to a portion of the spring brake chamber 14 between the service/spring adaptor housing 18 and the diaphragm 66 to maintain the spring diaphragm 66, and thus the push rod 10, essentially in the retracted position illustrated in FIG. 1. In this position, the push rod 10 normally would be operated as described above by selective pressurization of air into the service brake chamber through the aperture 34. However, in the event of failure of the air pressure system or by application of a parking brake (not shown), the pressure in the spring chamber will be decreased so that the springs 56, 74 would no longer be able to overcome the force of the much larger and stronger compression spring 90. Thus, the pressure plate 72 forces the spring diaphragm 66, and thus the adaptor push rod 68 to the left as viewed in the drawings, thereby also forcing the push rod 10 to an operative position applying the braking pressure to the brakes.

It is thus seen that the invention provides a very economical, effective and reliable means to indicate when brakes are in need of adjustment or repair. The problems of stroke indicators becoming separated, or requiring recalibration or expensive additional circuitry and mechanisms are thus solved in a very practical manner. Reasonable variation and modification are possible within the scope of the foregoing disclosure without departing from the spirit of the invention as defined in the appended claims.

The embodiments of the invention in which an exclusive property or privilege is claimed are as follows:

1. In an air-operated diaphragm spring brake comprising:
    a housing defining a chamber,
    a push rod extending through an opening in the housing and having an outer end which is adapted to connect to and to act upon a braking mechanism exterior to the housing, and
    a diaphragm within the chamber for actuating the push rod longitudinally between operative and inoperative positions,
    the improvement which comprises:
    a visual indicium provided by a discontinuity formed in the surface of the push rod in a position whereby a portion of the indicium will be exterior to the housing only when the push rod is in the operative position and the braking mechanism is substantially out of adjustment.

2. An air operated diaphragm spring brake according to claim 1 whereby the discontinuity comprises at least one indentation.

3. An air operated diaphragm spring brake according to claim 2 including a coating applied at the discontinuity to fill the said at least one indentation with the coating.

4. An air operated diaphragm spring brake according to claim 2 wherein the said at least one indentation is a groove.

5. An air operated diaphragm spring brake according to claim 1 and further comprising a second indicium on the push rod intermediate the visual indicium and the outer end to indicate the existence of the visual indicium when the visual indicium is within the chamber.

6. An air operated diaphragm spring brake according to claim 5 wherein the second indicium is provided by a second discontinuity formed in the surface of the push rod.

7. An air operated diaphragm spring brake according to claim 6 wherein the second discontinuity comprises at least one indentation on the push rod.

8. An air operated diaphragm spring brake according to claim 7 wherein the second discontinuity is adjacent to the opening and exterior to the housing when the push rod is in the inoperative position.

9. An air operated diaphragm spring brake according to claim 7 wherein the push rod is coated at the position of the second discontinuity to fill the said at least one indentation with the coating.

10. An air operated diaphragm spring brake according to claim 7 wherein the said at least one indentation is a groove.

11. In an air operated diaphragm spring brake comprising:
    a housing defining a chamber,
    a push rod extending through an opening in the housing and having an outer end which is adapted to connect to and to act upon a braking mechanism exterior to the housing, and
    a diaphragm within the chamber for actuating the push rod longitudinally between operative and inoperative positions,
    the improvement which comprises:
    a first visual indicium provided by a discontinuity formed in the surface of the push rod in a position whereby a portion of the indicium will be exterior to the housing only when the push rod is in the operative position and the braking mechanism is substantially out of adjustment, and
    a second visual indicium formed by a discontinuity intermediate the first visual indicium and the outer end whereby the second visual indicium will be adjacent the opening exterior to the housing when the push rod is in the inoperative position.

12. An air operated diaphragm spring brake according to claim 11 wherein one of said discontinuities comprises at least one indentation on the push rod.

13. An air operated diaphragm spring brake according to claim 12 including a coating applied at said one of said discontinuities to fill said at least one indentation with the coating.

14. An air operated diaphragm spring brake according to claim 12 wherein said at least one indentation is a groove.

* * * * *